United States Patent [19]

Wolf

[11] 4,243,315

[45] Jan. 6, 1981

[54] DEVICE FOR SELECTIVELY DISTORTING REFLECTED IMAGES AND THE METHOD OF PERFORMING SAME

[76] Inventor: Clifford R. Wolf, 33 Glacier Dr., Morris Plains, N.J. 07950

[21] Appl. No.: 935,164

[22] Filed: Aug. 21, 1978

[51] Int. Cl.³ .............................................. G03B 27/68
[52] U.S. Cl. .................................... 355/52; 350/295; 352/85; 355/77
[58] Field of Search ............... 355/52, 72, 77; 352/85; 350/295, 291, 150, 220

[56] References Cited

U.S. PATENT DOCUMENTS

| | | | |
|---|---|---|---|
| 1,457,209 | 5/1923 | Chanier | 355/52 X |
| 1,501,161 | 7/1924 | Cooke | 355/52 |
| 2,565,446 | 8/1951 | Abbott | 355/72 X |
| 3,001,196 | 9/1961 | McIlroy et al. | 350/295 X |
| 3,420,598 | 1/1969 | Goss | 350/295 UX |
| 3,623,796 | 11/1971 | Schweiger | 350/295 |
| 3,692,407 | 9/1972 | Ramsay | 355/52 |
| 3,893,755 | 7/1975 | Cobarg et al. | 350/295 |
| 3,972,600 | 8/1976 | Cobarg | 350/295 |
| 4,059,346 | 11/1977 | Levine et al. | 350/295 |
| 4,128,310 | 12/1978 | Miller | 350/295 |

FOREIGN PATENT DOCUMENTS 1060662  3/1967  United Kingdom ...................... 350/295

OTHER PUBLICATIONS

"Curved Space Photography", R. Landau, British Journal of Photography, vol. 125, No. 6142, pp. 312, 313.

Primary Examiner—Richard A. Wintercorn
Attorney, Agent, or Firm—Philip Furgang

[57] ABSTRACT

Disclosed is a device for imparting visual effects to reflected images. A housing is provided in which two mirrors are disposed. The first mirror reflects the image of the object to the second mirror. The second mirror reflects the image of that object to a recording device, such as a camera, or the like. The first mirror comprises a mirrored Mylar, which is backed with Lycra and a screen. By deforming the screen in the desired area, either by use of a suction produced by a blower motor, or the like, or by pushing outwardly, as with a screwdriver blade, or the like, the object can be made to appear deformed or otherwise be selectively animated in that location.

19 Claims, 5 Drawing Figures

DEVICE FOR SELECTIVELY DISTORTING REFLECTED IMAGES AND THE METHOD OF PERFORMING SAME

BACKGROUND OF THE INVENTION

This invention relates to means and method of recording images, such as by means of a photographic still or motion picture camera, by a television camera, or the like, and, more particularly, to a device for selectively distorting the image to be recorded for use in photographic effects including, but not limited to, animation.

In the techniques for recording images, it has often been desirable to selectively distort portions of the recorded images. In the past, this was frequently done by use of animation, in which the distorted portion is painted in. Thus, for example, animals, such as dogs or horses, have been made to appear to talk by drawing on the film a moving mouth.

Recently, the use of electronic manipulation of figures has been used to simulate distortion in video recording. One area of photographic technique which has not been readily employed is the direct mechanical distortion of the image by use of a flexible mirror. Most prior art uses of a mirror have been restricted to generally and uniformly varying the focal length.

Thus, it has been well known to provide mirrors for reflecting images and to change the curvature of the mirrors to alter the focal length. Thus, Schweiger, in U.S. Pat. No. 3,623,796, discloses a mirror with an adjustable focal length. The apparatus comprises an elastomeric deformable foil mirror which is secured to a frame. The frame and mirror enclose an airtight chamber which is, in turn, coupled to a vacuum source through an opening. By selectively varying the pressure in the chamber, the mirror can be deformed so as to change the focal length of the mirror.

Cobarg et al., in U.S. Pat. No. 3,893,755, also selectively changes the focal length of a mirror by means of a vacuum source or by mechanically moving the surface of the mirror.

In a like manner, the devices disclosed by Chanier, in U.S. Pat. No. 1,457,209, and Cooke, in U.S. Pat. No. 1,501,161, disclose a combination of a camera and a flexible mirror in which the focal length of the mirror may be altered to produce a distorted image.

In some instances, it is believed that at least one prior art device is provided with a complex mechanism for selectively distorting predetermined portions of a mirror in order to selectively distort the reflected image, which is pre-aligned with the distortable portions. However, it is believed that none of these devices is suitable for use in connection with motion picture or video photography, in which it is desired to distort selected portions of an image which may be located at any distance and position in the recording field.

SUMMARY OF THE INVENTION

It is an object of this invention to provide a means for and method of distorting selected portions of the image of objects for use in animating still figures and photographs and in which the objects need not be fixed at one particular location, with reference to the reflecting surface;

It is a further object of this invention to provide a mechanism and method for reflecting the image of objects for use in recording the image which will give a true representation of the object's appearance, except for that portion which is selectively distorted;

It is still another object of this invention to provide a simple and economical means and method of selectively distorting portions of an object for use in photography and other means of recording images.

Other objects of the present invention will be readily understood from considering the following description, drawings, and claims.

In accordance with the teachings of this invention, there is provided a device for selectively distorting the image of an object for the purpose of recording the distorted image, as by means of a TV camera, motion picture camera, or similar recording means.

The device comprises a housing. A first resilient mirror member is secured to the housing and is positioned to reflect the image of the object so it may be recorded by the recording means. Means are provided for deforming limited portions of the mirror member, so as to selectively distort a part of the reflected image. This deforming means is invisible to the recording means.

In another aspect of this invention, there is provided a method of selectively distorting an image for recording. This process comprises the steps of providing an object for recording; providing means for reflecting the image of the object; providing a means for recording the reflected image of the object; and distorting selective portions of the reflecting means, so as to distort only a part of the reflected image.

A BRIEF DESCRIPTION OF THE DRAWING

DESCRIPTION OF THE PREFERRED EMBODIMENT

Figure 1:
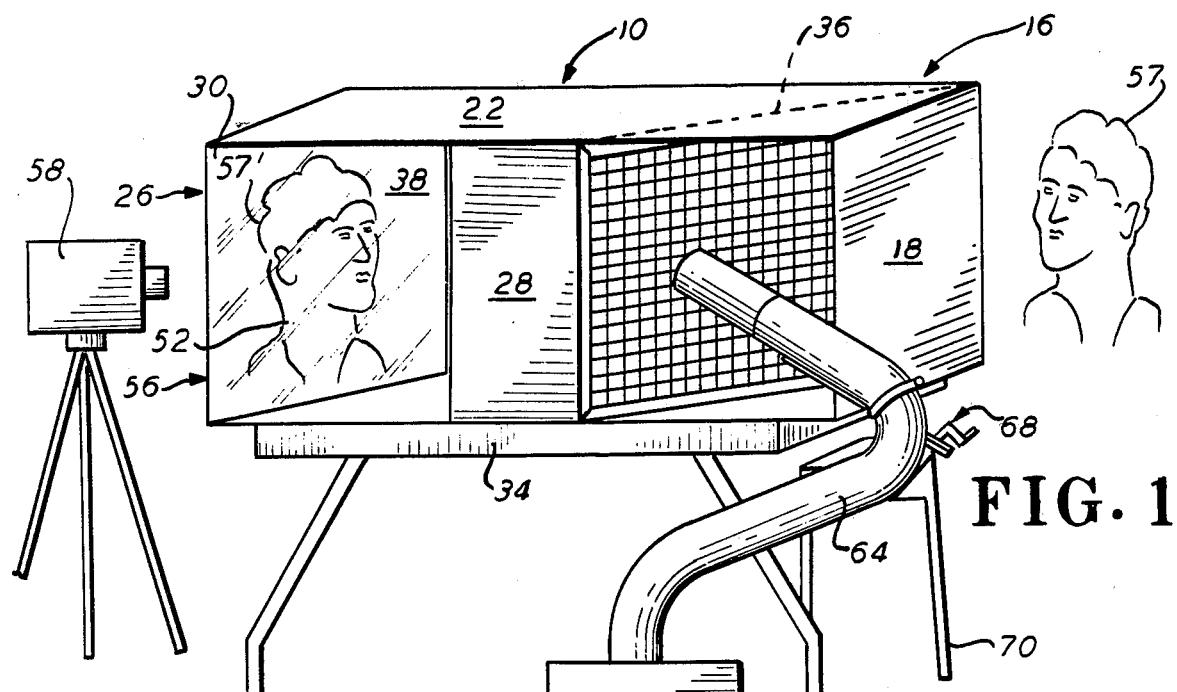
FIG. 1 is a rear perspective view of the device, constructed in accordance with the teachings of this invention.
Figure 2:
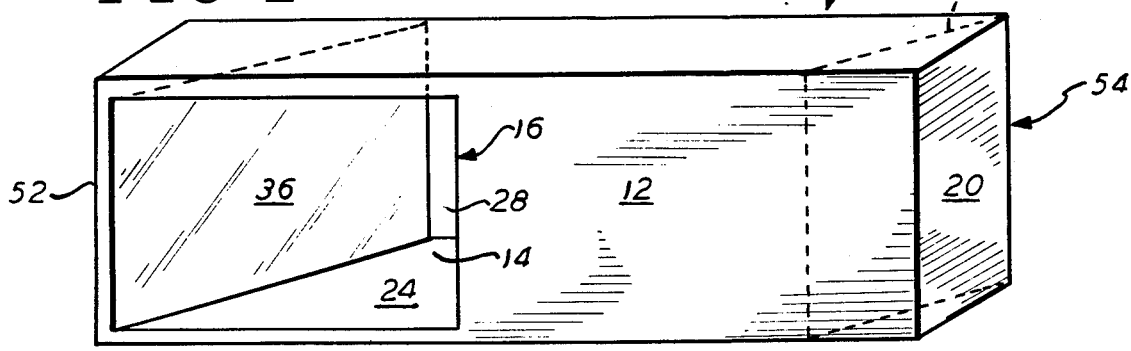
FIG. 2 is a front view of the device of FIG. 1.
Figure 3:
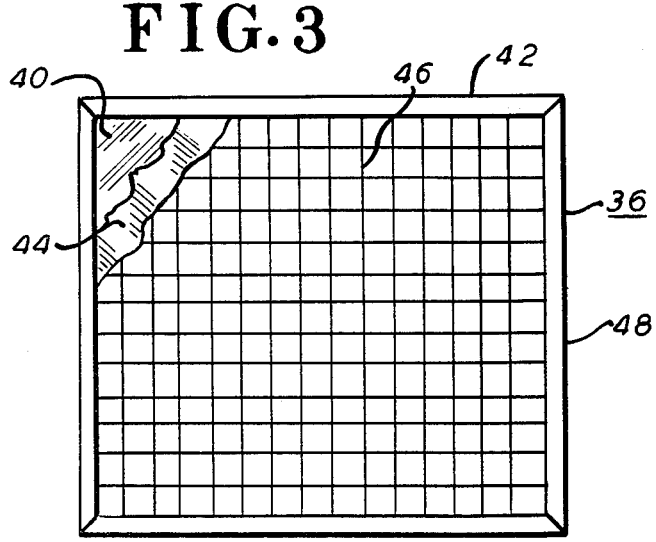
FIG. 3 is a partially sectioned rear plan view of a mirror, constructed in accordance with the teachings of this invention.

Disclosed is a housing 10 (FIGS. 1 and 2). The housing may have a generally rectangular configuration, with the major dimension being disposed in the horizontal plain. The housing 10 may be constructed of any convenient rigid structural material, such as plastic, wood, metal, or the like. Thus, by way of example only, the housing 10 may have a front panel 12 (FIG. 2) which may have dimensions of, for example, 36 inches × 13½ inches in height. The front panel 12 may have a rectangular front opening providing access to the interior 14 of the housing 10. The rectangular opening 16 may be disposed at the left side of the front panel 12, as viewed from the front (FIG. 2) and may have, for example, dimensions of 14 inches in length and 10 inches in height. The purpose of this front panel rectangular opening 16 will be more fully discussed hereinafter.

The housing 10 may also be provided with side panels 18 (FIG. 1) and 20 (FIG. 2). In this example, the side panels 18 and 20 may have dimensions of 13½ inches in height and 14 inches in width. Thus, the front panel 12 and side panels 18 and 20, taken together, define the height, length, and width of the housing 10. Accordingly, in this example, there may be provided a top panel 22 and bottom panel 24, each being 36 inches long and 14 inches wide.

The rear 26 (FIG. 1) of the housing 10 is generally open with a panel 28 of approximately 13½ inches in height and 10 inches in width being disposed at approximately the mid-point along the length of the rear. This mid-panel 28 thereby divides the rear side 26 into two open rectangular sections 30 and 32. The entire housing 10 may be disposed upon any support means, such as a table or stand 34 (FIG. 1).

The housing 10 may be provided with two mirrors 36 and 38. Each mirror 36 and 38 may have a generally rectangular shape. The first mirror 36 may be made of a flexible and resilient material, such as Mylar 40. Thus, in this example, Mylar of one-half mil thickness may be used. Flexible and resilient Mylar mirrors are well known in the art. The Mylar mirror 40 may be secured to a rigid frame 42, which may be made of wood, metal, or the like. The mirror 36 may be backed with a flexible and resilient cloth or material, such as Lycra or laytex or the like 44. Covering the mirror 40 and Lycra 44 may be a fine nylon mesh screen 46, all of which are secured to the frame 42 by means well known in the art. This combination of the Mylar mirror 40, Lycra 44, and screen 46 secured in the frame 42 is placed in the interior 14 of the housing 10. The mirror 36 may be releasably secured so that other mirrors of a similar construction can be used in its place. One side 48 of the mirror 36 may be disposed substantially at the left side 52 of the front panel 12. The mirrored surface 40 of the first mirror 36 may be seen through the front rectangular opening 16, and the screen side 46 of the mirror 36 is visible through the first rectangular opening 30 at the rear 26 of the housing 10. Thus, it will be immediately apparent that if an object 54 is disposed in front of the housing 10 so that its image may be reflected by the mirrored surface 40, the reflection of that image will be along the length of the housing 10. At the opposite end, or right front side 54 of the housing 10, may be disposed the second mirror 38. The second mirror 38, which may be of any suitable construction, is disposed at an angle with one side 56 aligned with the left side of the second rectangular opening 32 at the rear 26 of the housing 10 (FIG. 1). The opposed side is angled inwardly at an acute angle with respect to the right side panel 20 (as viewed from the front FIG. 2). [The second mirror 38 is shown in phantom in FIG. 2.] Thus, it will be immediately apparent that an object 54 disposed in front of the front rectangular opening 16 will be reflected by the mirror 36 to the second mirror 38 and that that image 54' will be reflected out of the rear 26 of the housing 10 through the first rectangular opening 30, to be recorded by any photographic or other recording means, such as a motion picture camera or TV camera 58. This arrangement of reflecting the image of an object through a housing to be recorded by a camera is not in and of itself considered unique or novel. However, the use of a flexible and resilient mirror 36, as hereinafter further discussed, does present both novel and unexpected results.

Disposed at the rear of the housing 10 may be means for distorting the reflective surface 40 of the first mirror 36. Thus, for example, there may be provided a blower motor 62, which is capable of drawing in large quantities of air. The air may be drawn through a tube or funnel 64. In prior art devices, a mirror has been distorted uniformly by causing a vacuum which thereby draws in the mirror to a predetermined configuration. That, however, is not the purpose of this invention. Rather, what is desired is to reduce the air pressure behind an isolated portion or portions of the mirror 36, to thereby cause that selected portion of the mirror to be pulled into a sharply convexed configuration at that point or area. Thus, in the instance of the use of a blower motor 62, it has been observed that the best type of device to use is a 1½ horsepower rotary blower motor. The reduction of air pressure caused by the flow of air into the tube causes the mirror 36 to deform in the immediate location and area, as defined by the nozzle opening.

Figure 4:
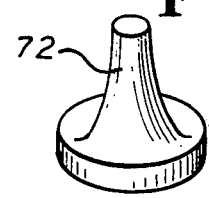
FIG. 4 is a perspective view of a funnel for use in channeling air flow to distort the mirror of FIG. 3.
Figure 5:
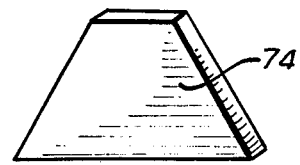
FIG. 5 is a perspective view of another funnel for use in channeling air flow to distort the mirror of FIG. 3.

The area of the Mylar screen 40, which is deformed, may be determined by closing the nozzle opening. Thus, for example, two nozzles 72 and 74 (FIGS. 4 and 5) may alternately be disposed over the end of the hose 64 to vary the area and shape through which the air will travel past the screen and into the blower motor 62. The benefit of this system is that the subject 54 does not have to be fixed with respect to a specific part of the Mylar mirror 40, but may be moved about with respect thereto and in connection with its use. Thus, for example, if the object 54 formed part of a larger scene, the scene need not be adjusted to conform to the operational characteristics of the mirror.

The hose 64 may be disposed on a worm gear 68, as is well known in the art. The worm gear 68, of course, is supported by a stand 70. Thus, the hose 64 may be moved into and out of contact with the screen 46 as the need occurs during recording of the image.

The unexpected result is that the image at that location is reduced in size in dependence upon the flow and quantity of air movement into the tube 64 and the flexibility of the combination of the Mylar mirror 40 and Lycra backing 44. The screen 46 protects the mirror 40 from being drawn into the nozzle 62. The photographic effect, which is believed to be startling, is the immediate reduction of that particular part of the image. Thus, for example, with sufficient amount of air flow, an entire portion of an object may be removed from the picture. The effect is an abnormally reduced portion of the image with very little distortion to the surrounding area. This occurs because the Mylar 40 can stretch at an isolated point without distorting the remaining portions of the surface of the mirror 36. In addition, it should be noted that the screen 46 is intended to prevent the Mylar from being drawn to the point where it will be permanently distorted. It thereby keeps the Mylar within its limts of elasticity.

The visual effects of isolated distortion by forming a concavity has its converse by the forming of a convexity. This may be performed by using an object, such as a stylus, screwdriver blade, or the like to push outwardly.

Thus, for example, it has been observed that by disposing a photograph of a kitten in front of the mirror 40, its lips may be made to appear to move when a screwdriver blade is pushed at the location of the reflection of the image of the cat's mouth, the blade being aligned in the plane of the lips of the cat. By pushing on the screen with the blade, the lips appear to move outwardly. In this manner, characters disposed—for example, characters as seen on the pictured products—may appear to move their lips or in other ways be moved without the necessity of animating by drawing upon separate stills of a motion picture film or electronically deforming separate frames of a video recording.

It is to be understood that the shape of the housing and mirrors is chosen for the preferred embodiment and that any desired other configuration may be employed.

What is claimed:

1. A device for producing recordable visual effects in which a selected visual field is to be recorded by a television camera, movie camera, or other recording device, said device comprising:
   (a) a housing;
   (b) a first mirror secured to said housing, the reflective surface of said mirror presenting the reflected visual field to the recording device; and
   (c) a device for distorting said reflecting surface of said mirror so as to provide at least one predetermined area of distortion with reference to the reflected visual field, said device being randomly positionable and movable with reference to said reflecting surface thereby providing predetermined visual distortion at any desired location within said visual field.

2. A device as recited in claim 1, wherein said distorting device comprises means for distorting said reflective surface into a concavity with reference to said reflecting surface.

3. The device as recited in claim 2, wherein said distorting device comprises a blower motor having an air intake port; an air intake conduit secured to said air intake port; a nozzle secured to the free end of said conduit; said nozzle being disposed on the side opposed to said reflective surface of said first mirror, so that air being drawn by said blower motor passes between said first mirror and said nozzle and into said conduit thereby dropping the air pressure and said mirror resiliently deforming into said area of reduced pressure defined by said nozzle opening.

4. The device as recited in claim 3, wherein said nozzle having a generally funnel shape with the larger end thereof being at the free end and having an arcuate opening.

5. The device as recited in claim 3, wherein said nozzle having a generally funnel shape with the larger end thereof being at the free end and having a substantially polygonal opening.

6. The device as recited in claim 1, wherein said distorting device comprises means for distorting said reflective surface into a convexity with reference to said reflecting surface.

7. The device as recited in claim 6, wherein said distorting device comprises a rigid member for pressing upon the side opposed to the reflective side of said mirror.

8. The device as recited in claim 1, wherein said first mirror means comprises a rigid frame and a reflective, flexible plastic film secured to said rigid frame, said frame being releasably secured to said housing; said housing having an aperture therein for receiving the visual field; said first mirror being disposed within said housing so that the visual field is reflected from said first mirror to the recording device; said distorting device being disposed upon the side of said mirror opposed to said reflective surface, whereby said distorting device is not recordable by the recording device.

9. The device as recited in claim 8, wherein said first mirror further comprises backing means secured to said mirror and disposed between said reflective film and said distorting device for protecting said reflective film from said distorting device.

10. The device as recited in claim 9, wherein said backing means comprises a screen.

11. The device as recited in claim 10, wherein said backing means further comprises a resilient fabric disposed between said film and said screen and fixedly secured to said frame and said fabric and said film are spaced from said screen.

12. The device as recited in claim 11 further comprises a second mirror secured to said housing and positioned so as to receive the visual field reflected from said first mirror and reflecting the visual field to the recording means.

13. The device as recited in claim 12, wherein said housing comprises a generally rectangularly shaped box-like housing with said visual field-receiving aperture being in the front side thereof; said first mirror being disposed to reflect the visual field along the length thereof, from one side of said box to the other side of said box; said second mirror being disposed at the opposed side of said box to receive the visual field for reflecting the image to the recording device; said housing having at least a first and second aperture in the rear side thereof; said first aperture being disposed such that the visual field reflected from said second mirror may be received by the recording device; said second rear aperture being disposed to provide access to said side opposed to said reflective surface of said first mirror; said distorting device being operatively coupled through said second rear aperture to deform said first mirror.

14. The device as recited in claim 13, wherein said distorting device comprises means for forming said area of distortion of said reflective surface into a concavity and wherein said distorting device comprises a blower motor having an intake port; an air intake conduit secured to said air intake port; a nozzle secured to the free end of said conduit; said nozzle being disposed on the side opposed to said reflective surface of said first mirrow, such that air being drawn by said blower motor passes between said first mirror and said nozzle and into said conduit, thereby dropping the air pressure and said first mirror resiliently deforming into said area of reduced pressure defined by said nozzle opening.

15. The device as recited in claim 13, wherein said distorting device comprises means for deforming said reflective surface in said area of distortion into a convexity and wherein said distorting device comprises a rigid member for pressing upon the side opposed to the reflective side of said first mirror.

16. The process of selectively distorting an image for recording, comprising:
   (a) providing an object for recording;
   (b) providing means for reflecting the image of the object;
   (c) providing means for recording the image;
   (d) distorting a portion of the reflecting means so as to present a visually distorted part of said reflected image with respect to the remainder of the image without substantially distorting other portions of the image.

17. The process as recited in claim 16, wherein said step of providing a reflective surface includes providing a resiliently deformable mirror.

18. The process as recited in claim 17, wherein said step of distorting comprises randomly selecting at least one predetermined area of said mirror and forming said area into a concavity.

19. The process as recited in claim 17, wherein said step of distorting comprises randomly selecting at least one predetermined area of said mirror and forming said area into a convexity.

* * * * *